June 16, 1936. J. F. LEVENTHAL 2,044,478
MOTION PICTURE FILM FEEDING DEVICE
Filed Jan. 18, 1935 2 Sheets-Sheet 1
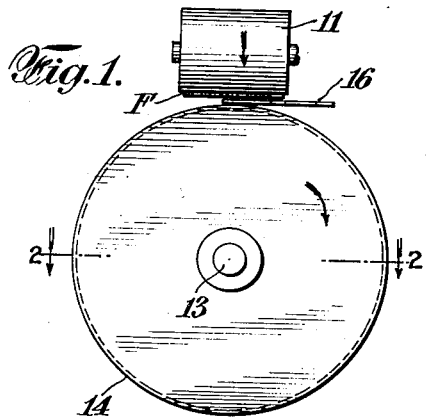
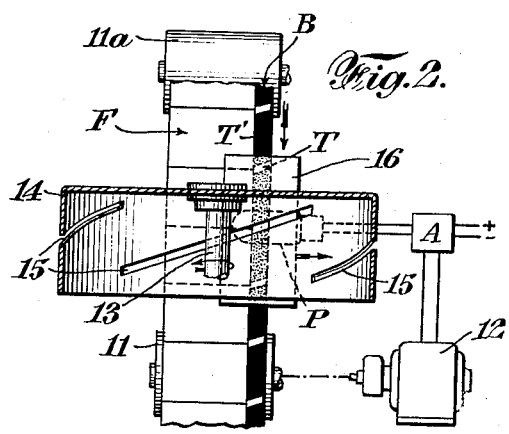
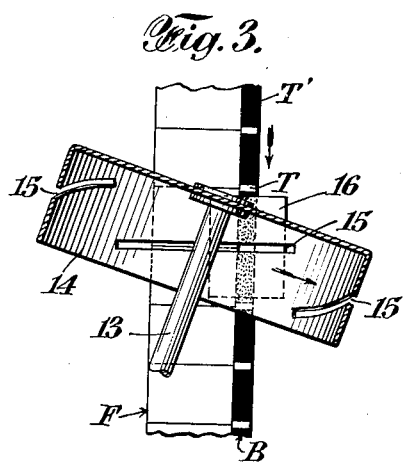
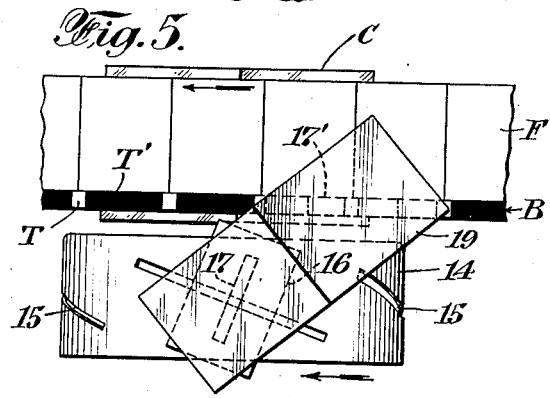
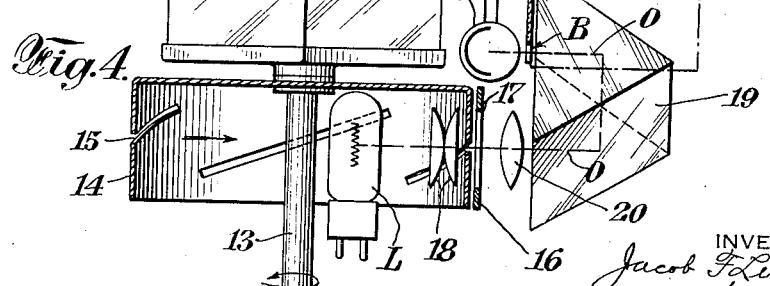
INVENTOR
Jacob F Leventhal
BY
Kenyon & Kenyon
ATTORNEYS.

June 16, 1936.    J. F. LEVENTHAL    2,044,478
MOTION PICTURE FILM FEEDING DEVICE
Filed Jan. 18, 1935    2 Sheets-Sheet 2
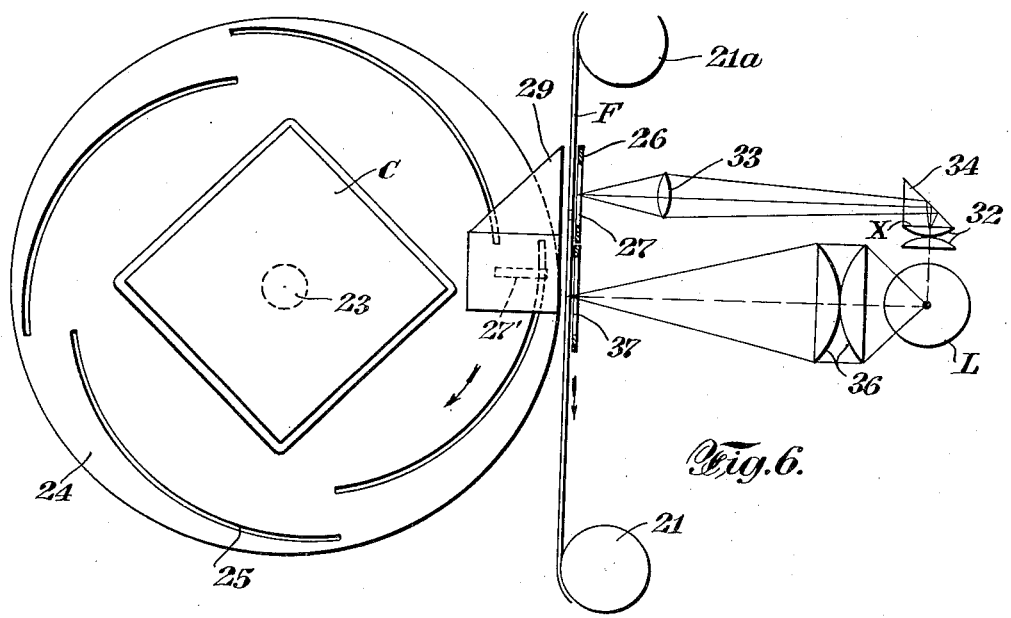
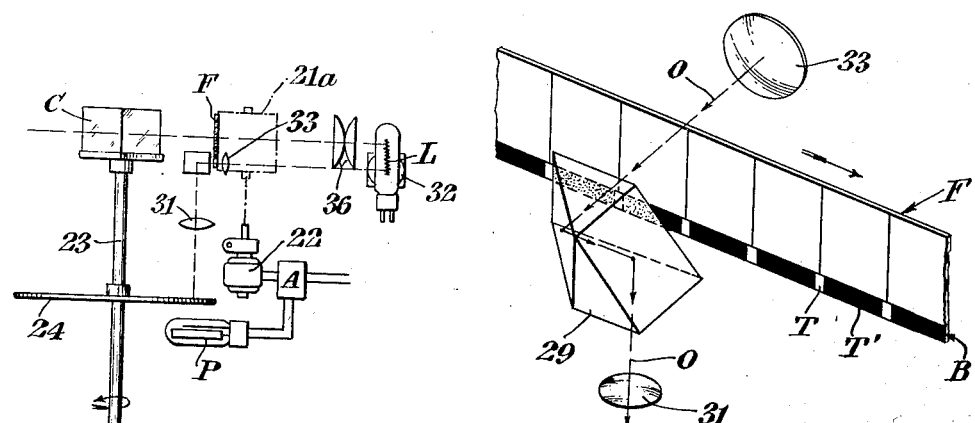
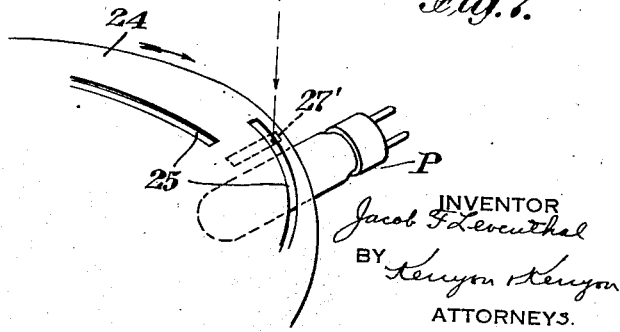
INVENTOR
Jacob F. Leventhal
BY Kenyon & Kenyon
ATTORNEYS.

Patented June 16, 1936

2,044,478

UNITED STATES PATENT OFFICE 2,044,478

MOTION PICTURE FILM FEEDING DEVICE

Jacob F. Leventhal, New York, N. Y., assignor to Leventhal Patents, Inc., New York, N. Y., a corporation of Delaware Application January 18, 1935, Serial No. 2,322

12 Claims. (Cl. 88—16.8)

This invention relates to motion picture film feeding devices.

Motion picture apparatus such as projectors, cameras and prints and the like are equipped with a shaft, the rotation of which establishes the picture cycle frequency of the apparatus. There may be one or more picture cycles for each rotation of the shaft depending upon the design of the apparatus.

An object of the present invention is a film feeding device for such apparatus which feeds the film uniformly at the rate of one film picture per picture cycle of the apparatus.

Heretofore, it has been the usual practice to feed the film by the use of perforations in the film into which project the teeth of a sprocket wheel timed with the picture cycle shaft. This type of feeding device has disadvantages incident to film shrinkage and in the application of Leventhal, et al. Serial No. 745,683 filed September 27, 1934 is disclosed a feeding device in which the sprocket wheels are eliminated and the film is frictionally fed by a smooth roller, the speed of which is controlled by photo-electric means responsive to the picture rate of feed of the film. This invention constitutes an improvement over the device of the above-cited Leventhal, et al. application in that it has advantages which will later become apparent.

Other objects, novel features and advantages of this invention will become apparent from the following specification and accompanying drawings, wherein:

Fig. 1 is an end view of one embodiment of the invention;

Fig. 2 is a section on the line 2—2 of Fig. 1;

Fig. 3 is a fragmentary view similar to Fig. 2 of a modified embodiment of the invention;

Fig. 4 is a fragmentary section of a motion picture projector equipped with a further embodiment of the invention;

Fig. 5 is an elevation of the device shown in Fig. 4;

Fig. 6 is a fragmentary section through a motion picture projector equipped with a still further embodiment of the invention;

Fig. 7 is a fragmentary perspective view of the device shown in Fig. 6, and

Fig. 8 is a diagrammatic elevation of the device shown in Fig. 6.

Referring now more especially to Figs. 1 and 2, motion picture film F is fed over spaced rollers 11 and 11a and the roller 11 is driven by the motor 12. The picture cycle frequency shaft 13 extends longitudinally of the film F and carries a drum 14 in the periphery of which are provided four slots 15 arranged obliquely to the axis of the shaft 13, the ends of each slot being offset a distance equal to the height of a picture frame. Along one edge of the film F is a signal band B consisting of alternate areas T and T' of different light transmitting quality. The areas T are of better light-transmitting quality than the areas T' and are equal in height to the slots 15 and have the same oblique arrangement as said slots, there being one area T for each film picture.

A shield 16 is interposed between the drum and the film F and has a slot 17 of the same width as the signal band on the film and is equal in length to the height of a picture frame.

On the side of the film opposite the drum there is provided a light sensitive or photo-electric cell P and within the drum there is provided a light source L, not shown in Figs. 1 or 2, but arranged as shown in Fig. 4. The photo-electric cell P is connected to a power amplifier A, the output of which is connected to the motor 12 and is effective to vary the speed of the motor 12 in a manner later to be described. The arrangement just described is effective to advance the film F a predetermined number of pictures for each rotation of the shaft 13, the number of pictures that the film is advanced being equal to the number of slots 15 in the drum 14.

In normal operation, a light beam falls on the film in register with the signal band B and moves along with it. The extent of registration of the light beam with a film area T determining the amount of light which reaches the cell P and variation in the amount of light results in regulation of the speed of motor 12 to maintain the film speed at the rate of four pictures per revolution of the shaft 13. Thus, though motion picture film may change in length, it will still be fed by the above-described apparatus, evenly at a definite picture rate per revolution of the shaft 13.

The device disclosed in Fig. 3 is generally similar to the device disclosed in Fig. 2 except that the axis of the shaft 13 is arranged at such angle to the direction of travel of the film and the slots 15 are at right angles to the film, thus permitting the areas T also to be at right angles to the length of the film so that it is possible to use the standard sprocket wheel perforations as the areas T.

In Fig. 4 there is disclosed the application of the device above described to a motion picture projector of the continuous feed type. Here again, the picture cycle frequency shaft 13 carries the drum 14 having oblique slots 15 and within the drum is provided a lamp L and condenser lens 18. An optical compensator C is also mounted on the shaft 13 for unitary rotation therewith. The number of slots 15 equals the number of picture cycles undergone by the compensator C for each rotation thereof. In this particular instance, the compensator is illustrated as a refractor having four plane-parallel faces and passing through four compensation cycles per revolution; likewise the drum 14 is illustrated as having four slots 15. Just outside the drum 14 there is provided the shield 16 having the slot 17 extending substantially normal to the slots 15 so that there is provided a rectangular light transmitting aperture which, upon rotation of the drum 14 travels from one end to the other of the slot 17. The film F is fed past the optical compensator C in operative relation thereto and is advanced by the roller 11 rotated by the motor 12. The film is provided with the signal band B having the rectangular areas T and T' as previously described. A right prism 19 and lens 20 are provided and arranged to form an image 17' of the slot 17 on the film F in register with the signal band B. The optical axis O of the lens 20 is twice deflected by the prism 19 as shown in Fig. 4. The photo-electric cell P receives light passing through the areas T and is connected to the power amplifier A to control the speed of the motor 12. As each slot 15 passes over the slot 17, the lens 20 will form on the band of the film a moving image of the rectangular aperture defined by the slots 15 and 17, the image moving in the direction of film travel and being equal in size to the areas T. The aperture image will move from one end to the other of the slot image 17'. The extent of registration of the aperture image with the areas T varies the amount of light reaching the photo-electric cell and variation in the amount of such light results in regulation of the speed of the motor 12 to maintain the film speed at the rate of four pictures per revolution of the shaft 13.

In the embodiment shown in Figs. 6, 7 and 8, the same source of light is used both to project the film picture on to a screen and to govern the feeding rate of the film. The picture cycle frequency shaft 23 carries a disk 24 having four spiral slots 25, the ends of which are radially offset a distance equal to the height of a picture frame. The film F passes from roller 21a to roller 21 which is driven by motor 22. On one side of the film F there is arranged a shield 26 having a slot 27 equal in length to the height of a picture frame and of the same width as the signal band B on the film. Lens 33 and prism 34 are provided for imaging the face X of the condenser 32 at the shield 26. On the other side of the film from the shield 26 is a compound prism 29 which is effective to twice deflect the optical axis O as shown in Fig. 7 first parallel to the film and then at right angles and a lens 31 is provided for producing on the disk 24 an image 27' of the slot 27 substantially normal to the slot 25. Below the disk 24 is arranged the photo-electric cell P which is connected to an amplifier A to control the speed of the motor 22. The shaft 23 carries a four-cycle optical compensator C in operative relation to the film F. A condenser lens 36 forms an image of the light source L at the film and a projection aperture 37 is provided for limiting illumination of the film to a single picture. The prism 29 terminates at the edge of the signal band B of the film and so presents no interference with the projection of the picture.

As the film moves past the shield 26, each area T constitutes with the slot 27 a moving light aperture which is imaged on the disk 24 and the operative image moves from one end to the other of the slot image 27'. The extent of registration of this operative image with the slot 26 controls the amount of light passing to the photo-electric cell and variation in the amount of such light results in regulation of the motor 22 to maintain the film speed at four pictures per revolution of the shaft 23.

The number of slots in the rotating member is proportional to the number of picture cycles per revolution of the picture cycle shaft, and the rate of rise of such slots is directly proportional to the rate of rotation of said shaft. The objective lens and the prism are effective to image either stationary or moving slots while the two slots cooperate to confine the image to an area of predetermined width and of a length equal to the rise of a spiral times the image magnification.

The arrangements disclosed in Figs. 4 to 8 inclusive have the advantage over the arrangements disclosed in Leventhal, et al. Serial No. 745,683 that both the compensator and the slotted member 14 or 24 are mounted on one end and the same shaft so that there can be no relative movement between them. In addition to this advantage, the devices of Figs. 4 to 8 inclusive have the added advantage of greater simplicity of structure and less number of parts such as gear wheels and the like.

It is to be understood that in operation of the various devices herein disclosed, there is normally only partial registration of the light aperture or its image with a light transmitting film area, although in the drawings, for simplicity's sake, full registration has been shown. The arrangement of the various elements is such that there is a degree of registration between zero and complete registration at which the film is advanced at the proper rate and variation from such degree of registration effects regulation of the speed of the driving motor to feed the film at the proper linear speed to compensate for variation in film length or for film slippage.

Although in Figs. 5 to 8 inclusive, there is illustration of the slot images 17' and 27', it is evident that the optical systems shown therein are adapted to image the slots 15 and 25 normal to the signal band B, assuming that in the case of Figs. 4 and 5, the shield 16 were removed and assuming in the case of Figs. 6, 7 and 8 the light source to be located in the position in which the photo-electric cell is shown. The optical system is adapted to so image the slots 15 and 25 even though such images may actually not be produced.

I claim:

1. In motion picture apparatus of the type having a rotatable picture cycle shaft, a circular shield axially mounted on said shaft and carrying peripherally disposed spiral light transmitting slots proportional in number to the number of picture cycles per revolution of the shaft, the rate of rise of each spiral slot being directly proportional to the rate of rotation of the shaft, an objective lens and light deflecting means associated with said shield for imaging at a desired plane the spiral slots as they pass through the field of the lens, means for illuminating the slots during passage through the lens field, and means for confining the slot images to an area of predetermined width in said desired plane and of a length equal to the rise of a spiral slot times the image magnification.

2. In motion picture apparatus of the type having a rotatable picture cycle shaft, the combination of film provided with a longitudinal signal band consisting of alternate areas of different light transmitting quality, an optical compensator mounted on said shaft, means including a roller for feeding film in operative relation to said compensator, a light source, a light sensitive element, an optical system including a lens and double deflecting means having its optical axis extending through said light source, light sensitive element and signal band, a member mounted on said shaft and interceptive of light passing from said source to said element, a stationary member having a slot optically parallel to said film band through which passes said optical axis, said first member having a slot cooperative with the first mentioned slot upon rotation of said member, to define a light transmitting aperture which moves from one end to the other of the first mentioned slot, and means responsive to said light sensitive element for variably rotating said roller.

3. In motion picture apparatus of the type having a rotatable picture cycle shaft, the combination of film provided with a longitudinal opaque band interrupted by light transmitting areas, an optical compensator mounted on said shaft, means including a roller for feeding film in operative relation to said compensator, a drum mounted on said shaft and provided with peripheral slots having their ends offset axially of said shaft, a light source, and a light sensitive element, one being enclosed by said drum and the other being adjacent the film, a stationary member having a slot substantially normal to the drum slots, an optical system including a lens and double deflecting means having its optical axis extending through said light source, light sensitive element, stationary slot and film band, means responsive to light sensitive element for variably rotating said roller, said slots being cooperative upon rotation of said drum to define a light transmitting aperture which moves from one end to the other of the stationary slot and said optical system being effective to image said stationary slot in registration with the film band.

4. In motion picture apparatus of the type having a rotatable picture cycle shaft, the combination of film provided with a longitudinal opaque band interrupted by light transmitting areas, an optical compensator mounted on said shaft, means including a roller for feeding film in operative relation to said compensator, a disk mounted on said shaft and having spiral slots, a stationary member having a slot in register with the film band, means for directing light to said member, an optical system comprising double deflecting means and a lens for directing light from said stationary slot to said disk and producing an image of said slot on said rotating member substantially normal to the slots therein, a light sensitive element energized by light passing through said disk slots, and means responsive to said light sensitive element for variably rotating said roller.

5. In motion picture apparatus of the type having a rotatable picture cycle shaft, the combination of film provided with a longitudinal opaque band interrupted by light transmitting areas, an optical compensator mounted on said shaft, means including a roller for feeding film in operative relation to said compensator, a drum mounted on said shaft and provided with peripheral slots having their ends offset axially of said shaft, a light source, and a light sensitive element, one being enclosed by said drum and the other being adjacent the film, a stationary member having a slot substantially normal to the drum slots, said slots being cooperative upon rotation of the drum to define an aperture which moves from one end to the other of the stationary slot, an optical system including a lens and double deflecting means effective to direct light from said aperture through the signal band to said light sensitive element and to image said stationary slot in register with the signal band, and means responsive to said light sensitive element for variably rotating said roller.

6. In motion picture apparatus of the type having a rotatable picture cycle shaft, the combination of film provided with a longitudinal signal band consisting of alternate areas of different light transmitting quality, an optical compensator mounted on said shaft, means including a roller for feeding film in operative relation to said compensator, a member carried by said shaft and provided with slots having offset ends, an optical system comprising a lens and double deflecting means adapted to image said slots normal to the signal band upon rotation of said member, a stationary slot optically parallel to said signal band and co-operative with the first named slots upon rotation of said member to define an aperture for light passing through said signal band, a light source and a light sensitive element between which light passes through said aperture, optical system and signal band, and means responsive to said light sensitive element for variably rotating said roller.

7. In motion picture apparatus according to claim 6, the combination in which the member carried by the picture cycle shaft is a drum having peripheral slots with their ends axially offset.

8. In motion picture apparatus according to claim 6, the combination in which the member carried by the picture cycle shaft is a drum having peripheral slots with their ends axially offset, and said stationary slot is physically normal to said drum slots.

9. In motion picture apparatus according to claim 6, the combination in which the member carried by the picture cycle shaft is a disk having spiral slots.

10. In motion picture apparatus according to claim 6, the combination in which the members carried by the picture cycle shaft is a disk having spiral slots, and said stationary slot is physically parallel to the signal band.

11. In motion picture apparatus according to claim 6, the combination in which the member carried by the picture cycle shaft is a disk having spiral slots, said stationary slot is physically parallel to the signal band, and means are provided for directing light from said source through said film to said compensator.

12. In motion picture apparatus according to claim 11, a light source comprising an electric incandescent lamp and a light sensitive element comprising a photo-electric cell operatively arranged with respect to the slotted drum.

JACOB F. LEVENTHAL.